United States Patent [19]

Rademaker et al.

[11] 3,721,865
[45] March 20, 1973

[54] PLASTIC CASE POWER SUPPLY

[75] Inventors: Leo C. Rademaker; Ezra C. Hill, both of Fort Wayne, Ind.

[73] Assignee: General Electric Company, Fort Wayne, Ind.

[22] Filed: Oct. 29, 1971

[21] Appl. No.: 193,935

[52] U.S. Cl. .................. 317/120, 336/92, 174/51, 174/52 R
[51] Int. Cl. ...................... H02b 1/18, H01f 27/02
[58] Field of Search ....317/99, 100, 101 R, 118, 120; 336/90, 92; 174/51, 52 R, 58

[56] References Cited

UNITED STATES PATENTS

| | | | |
|---|---|---|---|
| 3,187,084 | 6/1965 | Stillman | 174/58 |
| 3,634,598 | 1/1972 | Stanfield | 174/51 |
| 3,622,840 | 11/1971 | Kahn | 317/120 |
| 2,740,905 | 4/1956 | Henderson | 317/99 |

Primary Examiner—Robert K. Schaefer
Assistant Examiner—Gerald P. Tolin
Attorney—John M. Stoudt et al.

[57] ABSTRACT

A power supply includes a preformed case of electrically non-conductive material. Mounting bosses are integrally formed in the case to provide mounts for the power supply and mounting surfaces for active components of the power supply. Integral internal partitions and brackets mount various active components of the power in proper relationship in the case and provide electrical insulation where desired.

10 Claims, 6 Drawing Figures

PLASTIC CASE POWER SUPPLY

BACKGROUND OF THE INVENTION

This invention relates to electrical units such as power supplies and more particularly to such units having an integral, preformed case of electrically insulative material.

Power supplies serve to convert normally available electrical energy to highly regulated electrical energy which is held within very close tolerances as to voltage, current or frequency. Many such power supplies normally include a core and coil transformer, at least one main capacitor and a number of other active components. These may include rectifiers, other electronic components and additional capacitors, for example. It is desirable to mount the various active components in close proximity to one another and often to encapsulate the assembly in a moisture proofing potting material. At the same time, the electrical integrity of the power supply requires that various of the active components be electrically insulated.

One approach in the past has been to assemble a sheet metal case or housing, place the active components in the housing and then fill the housing with a suitable potting material. Such an approach requires that large amounts of the electrical insulation material, such as mica, placed by hand between adjacent high voltage components and between such components and the case. Also spacers and temporary retainers have to be hand placed in the assembly to assure that proper separation and positioning is provided when the potting material is added. All of this slows down the assemble time and adds excessive cost to the power supply. Other power supplies use the potting material to form the outer case or housing. Such an approach has many of the same problems and disadvantages as the sheet metal approach.

It is, therefore, an object of the present invention to provide an improved electrical unit such as a power supply.

Another object is to provide such a unit in which the need to provide separate insulation and spacers has been greatly alleviated.

Yet another object of the present invention is to provide such a unit including a preformed case of electrically nonconductive material.

Still another object of this invention is to provide such a preformed case, including bosses which provide means for mounting the unit and mounting surfaces for active components of the unit.

A further object is to provide such a preformed housing, including integral partitions and brackets for positioning and insulating various active components.

SUMMARY OF THE INVENTION

In accordance with one form of the present invention, we have provided a power supply including a core an coil unit, a capacitor and a case formed of relatively rigid, electrically non-conductive material. The case includes a base wall and a number of side walls, integrally formed to provide a chamber to receive the core and coil unit and the capacitor. A partition is integrally formed in the housing and divides the chamber into a core and coil unit receiving section and a capacitor receiving section. The partition includes a channel open to the core and coil unit receiving section. A boss is integrally formed in the case in register with the channel and a grounding conductor is received in the boss and channel.

The subject matter which we regard as our invention is set forth in the appended claims. The invention itself, however, together with further objects and advantages thereof may be better understood by referring to the following description taken in conjunction with the accompanying drawing in which:

DESCRIPTION OF THE PREFERRED EMBODIMENTS

Figure 4:
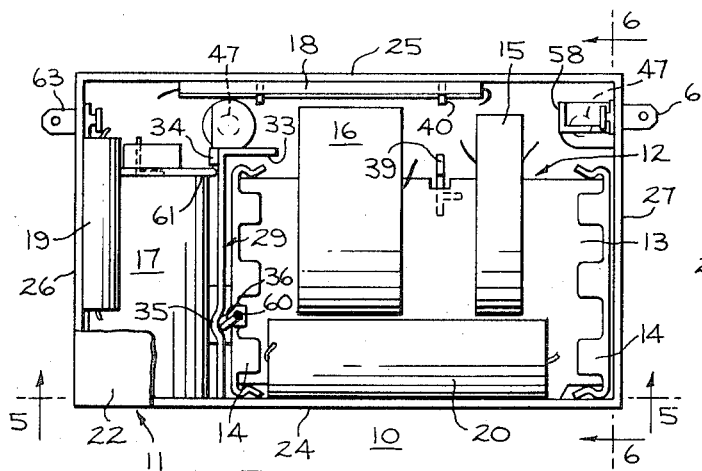
FIG. 4 is a top plan view similar to FIG. 1, but with various active components of an exemplification power supply in place in the case.

Referring now to the drawing, there is illustrated a power supply 10, including various active (or electrical) components received and supported in an integral, preformed housing 11. Referring particularly to FIG. 4, a typical power supply includes a core and coil transformer unit 12, comprising a laminated core 13 held together by a pair of end clamps 14 and supporting a primary coil 15 and a secondary coil 16; and a main or power capacitor 17. Typical power supplies also may include a number of other active or electrical components such as diodes or rectifiers 18, resistors 19 and additional capacitors 20. Since the active components of power supplies may vary as to type, number and electrical interconnections, the particular electrical interconnections of the components illustrated have not been shown.

Figure 6:
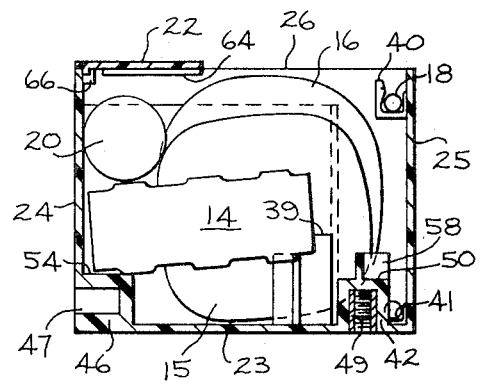
FIG. 6 is a cross-sectional view generally as seen along line 6—6 in FIG. 4.

The case 11 includes a base portion 21 and a cover 22 (a portion of which is shown in FIGS. 4 and 6). The base 21 is integrally preformed of a fairly rigid electrically non-conductive or electrically insulative material. By way of example, both the base 21 and cover 22 of the case may be moulded from a polycarbonate, any one of a number of phenolic resins, or any one of a number of polyester resins, either with or without fillers. The particular material is not critical so long as it is electrically non-conductive and is fairly rigid, so as to provide a stable support for the various active components in the power supply.

The base 21 includes a base wall 23 and spaced apart oppositely disposed side walls 24, 25 and 26, 27, which are integrally formed to provide a chamber 28 to receive the various active components of the power supply. A first partition 29 is integrally formed with the case so as to extend outwardly from the side wall 24 and the base wall 23 partially across the chamber 28. A main portion 30 of the partition 29 divides the chamber 28 into a core and coil unit receiving section 31 and a capacitor receiving section 32. The distal end of the main portion 30 is provided with a first flange portion 33 so as to extend into the core and coil unit receiving section 31, and a second flange portion 34, angled with respect to the main portion 30 so as to extend into the capacitor receiving section 32. The main portion 30 of the partition 29 is offset into the capacitor receiving section chamber at 35 so as to provide a channel 36 which extends across the partition 29 and is open into the core and coil receiving chamber section 31. It will be noted that the offset portion 35 is approximately the same distance from side wall 24 as flange portion 34 is from side wall 25, for purposes which will be discussed in more detail hereinafter.

A second partition, in the form of a footing 37, extends from the base wall 23 into the core and coil receiving section 31. The footing 37 is formed with a mounting surface 38 generally parallel to the base wall 23 and a top portion 39 extending from the mounting surface 38 in a direction away from the base wall 23. Two sets of brackets 40 and 41 are formed integrally with the side wall 25 and may serve as mounts for other active components of the power supply. The brackets 40 are spaced apart a distance below the upper edge of the side wall 25 while the brackets 41 are at the junction between side wall 25 and base wall 23. With this arrangement, the active component mounted in either set of brackets 40 or 41 will be contained within the space between the partition flange 33 and the side wall 25.

A plurality of mounting bosses are formed integrally with the housing and extend into the chamber 28. In the exemplification there are three such bosses (42, 43, and 44) formed in the base wall 23 and two such bosses (45 and 46) formed in the side wall 24. Each of these bosses includes a recess 47 which is open to the exterior of the case. Threaded lugs 49 are securely received within predetermined ones of the recesses to provide means for mounting the completed power supply to a suitable supporting member. In the illustrated exemplification the lugs are provided in the recesses in the bosses 42–44, as it is intended that this power supply be mounted with the base wall 23 adjacent the supporting member. Each of the bosses 42–46 includes a mounting surface 50, 51, 52, 53 and 54 respectively. These surfaces may be utilized as mounting surfaces to support various active components in spaced relationship to the base wall 23. Consequently, the bosses are designed to serve the dual purpose of mounting the power supply to a supporting member and assisting in the mounting of the active components within the power supply.

The recess 47 of boss 44 communicates with the channel 36 in partition 29 and is provided with an opening 55 directly in line with the channel 36. A grounding conductor 56 is firmly mounted in the recess 47 by being captured between the inner wall of the boss and the outer wall of the lug 49 mounted therein. This grounding conductor extends thru the opening 55 in the boss and is received in the channel 36. The outer end of the conductor 56 is formed as a loop 57 over the outer end of the cooperating lug so that the conductor is exposed to the exterior of the case for positive grounding.

An L shaped bracket 58 is formed integrally with the boss 42 and extends from the mounting surface 50 in a direction away from the base wall 23. This provides an additional bracket to selectively mount an additional active component (not shown). It will be noted that such a component mounted in bracket 58 will be in the space between the flange portion 33 and the side wall 25.

Figure 5:
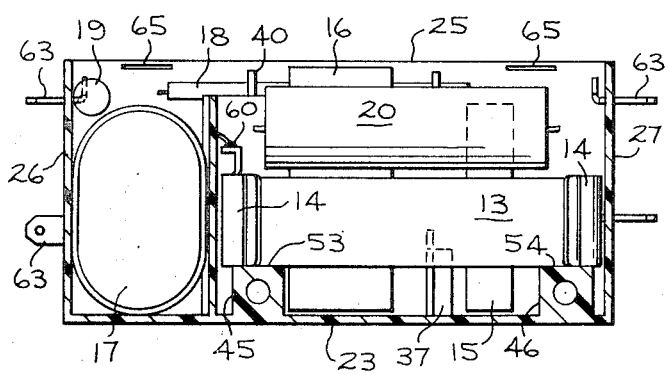
FIG. 5 is a cross-sectional view generally as seen along line 5—5 in FIG. 4.

Referring now more particularly to FIGS. 4–6, it will be seen that the core and coil unit 12 is received in the core and coil unit receiving section 31 of the chamber 28 with the core resting on mounting surfaces 53 and 54 of bosses 45 and 46 and mounting surface 38 of footing 37. With some core and coil units the diameter of the coils 15 and 16 may be sufficiently large that they will engage the bottom wall 23, so that the core 13 may not engage all of these mounting surfaces. However, the positioning of these mounting surfaces above the base wall 23 assures that there will be space between the base wall and the core, either when the coils are relatively small in diameter or, in the case of large diameter coils, by preventing tipping of the core within the chamber section. The flange 33 and tip 39 overlap the core and thus assure that the core does not slide within chamber section 31 in such a way to allow the coils 15-16 to come too close to side wall 25. Consequently, the integral bosses and partitions assure that the core and coil unit is properly positioned within the housing. The grounding conductor 56 may be attached to the core by some suitable means such as the solder joint shown at 60. By providing the channel 36 the ground conductor may be brought thru the housing from the base wall 23 and attached to the core and coil after its insertion into the housing and still be protected from damage should the core shift against the partition 29.

In the exemplification, when the capacitor 17 is placed in the capacitor receiving chamber 32 the flange 34 overlaps the lip or flange 61 of the capacitor and prevents movement of the capacitor from substantially the position indicated in FIG. 4 to a position more towards side wall 25. This provides a space for making connection to the capacitor terminals 62 as well as terminal 63 provided in the housing. It will be understood that, in the event it is desired to mount the capacitor 17 or other active unit in the chamber section 32 in a reversed orientation, that is toward wall 25, then the offset portion 35 of partition 29 will be in overlapping or interfering relationship with the flange 61 and will prevent the capacitor from moving any closer to side wall 24. This again assures sufficient space at the terminal end of the capacitor for making connections to the capacitor.

It will be seen that, while three mounting bosses 42, 43, 44 have been provided in side wall 24 and these are below the normal position of the core 13. This is done for ease of insertion of the core and coil unit 12 as there are no bosses projecting into the chamber 28 adjacent the upper edge of the side wall 24. With this arrangement the core and coil unit may be dropped directly into the core and coil unit receiving section 31 of the chamber 28. If additional attachment components are desired for use with the wall 24 there may be attached thru the wall after the core and coil has been inserted To this end wall 24 may be provided with one or two small areas of reduced thickness (not shown) which are removed for the insertion of a separate mounting lug. Particularly with a case which is designed for use with only one core and coil unit the spacing may be made such that integrally mounting bosses may be provided above the core and coil position in such a manner that the core and coil may be tipped and slipped between those lugs and the flange 33. Similarly mounting brackets for a active component such as the resistor 19 have not been provided above the position occupied by the capacitor 17. This enables the capacitor receiving section 32 of the chamber 28 to be sized so that the capacitor 17 fits fairly closely between the partition 30 and the side wall 26. Again, by proper selection of the dimensions, the side wall 26 may be formed with integral mounting brackets for supporting another active unit of the power supply over the capacitor 17.

Figure 1:
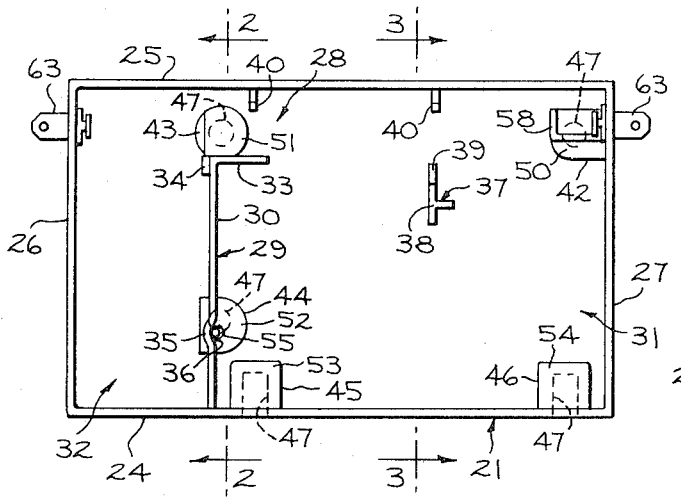
FIG. 1 is a top plan view of a preformed case, for use with a power supply in accordance with one embodiment of the present invention, with the cover removed for purposes of illustration.
Figure 2:
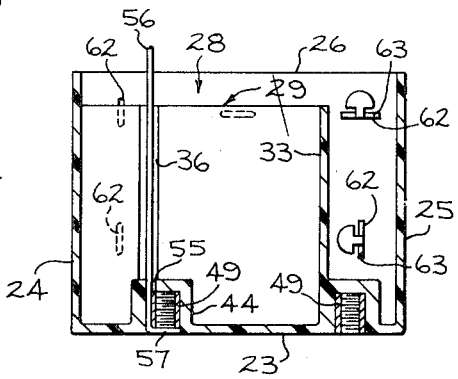
FIG. 2 is a cross-sectional view generally as seen along line 2—2 in FIG. 1.
Figure 3:
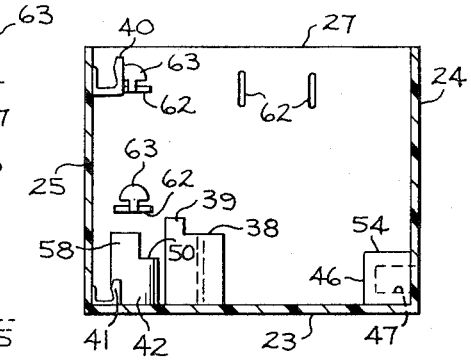
FIG. 3 is a cross-sectional view generally as seen along line 3—3 in FIG. 1.

Viewing particularly FIGS. 2 and 3, it will seem that slots 62 are provided at spaced points on the side walls 26 and 27 to fixedly receive power supply terminals such as those shown at 63. It will be recognized that, with the partitions, mounting brackets and mounting surfaces provided a number of terminal locations are available. This enables the terminals to be located at points best suited to the application of the power supply without unduly interfering with the active components within the power supply. It may be desirable to provide one basic case for use with a number of power supplies. In which event a variety of terminal mounting openings may be formed in the walls as the base is moulded. Thereafter, before potting compound is added to the case, the openings not having terminals are merely taped to prevent loss of potting compound. Alternatively, by way of example, various terminal locations can be moulded with only a thin webb of electrically insulative material, sufficient to restrain the potting compound. Thereafter the webbs at locations to have terminals will be removed at the time the individual power supply is constructed.

A case normally is completed by a preformed cover 22. A portion of such a cover is shown in FIGS. 4 and 6. In the illustrated exemplification the cover 22 is formed as a flat sheet which fits over the upper edge of the side walls 24–27. The cover may include a flange or ridge such as that shown at 64 which projects from the cover 22 into the cavity 28 adjacent each of the side walls. An oppositely disposed pair of the ridges are provided with fingers which snap into the detents 65 in the corresponding side walls to hold the cover in place. The cover also may include corner posts such as that shown in 66 to aid in assembling of the cover onto the base. Also the posts can project into the potting compound to provide additional structural integrity. In the event even greater structural integrity as desired for the final assembly the cover can be attached to the base by means of some suitable adhesive or sonic welding, for example.

In assembly, the core and coil unit 12 is placed in the core and coil receiving section 31; the capacitor 17 is placed in the capacitor receiving section 32; and one or more additional active units such as diode 18 are placed in brackets 40 and 41 as well as bracket 58. Additionally, active components such as resistor 19 and capacitor 20 can be placed on top of units such as the core and coil unit 12 or capacitor 17 without use of integral mounting means. The various electrical interconnections between the active units are made as the units are placed in the case to provide the desired circuit and the proper connections are made to the terminals 63. With the particular active components shown, the only additional hand placed insulation which might be desirable would be between the resistor 19 and the capacitor 20 and between the capacitor 17 and the core and coil unit 12, as well as perhaps some insulation between some of the leads and individual active components. Once the various active components are inserted in the case and the required electrical connections are completed the cavity 28 is at least substantially filled by some suitable potting material such as asphalt and then the cover place is on the unit to complete the power supply.

It will be understood from the foregoing that the amount of material and labor required for maintaining physical and electrical separation of the various active components of the power supply are greatly reduced by means of the present invention. It will be understood that the specific exemplifications of the invention which have been described herein are intended for illustrative purposes only and that many modifications may be made therein without departing from the invention. It is, therefore, intended in the appended claim to cover all such modifications as fall within the true spirit and scope of our invention.

What we claim as new and desire to secure by Letters Patent in the United States is:

1. A power supply, including:
   a. a core and coil unit;
   b. a capacitor;
   c. a case formed of relatively rigid, electrically non-conductive material, said case including a base wall and a plurality of side walls integrally formed to provide a chamber;
   d. a partition integrally formed in said case dividing said chamber into a first section having said core and coil mounted therein, and a second section having said capacitor mounted therein; said partition including a channel open to said first section;
   e. at least one mounting boss integrally formed in said case in register with said channel; and
   f. a grounding conductor for said core and coil received in said at least one mounting boss and said channel.

2. A power supply as set forth in claim 1 wherein:
   said partition extends from one side wall and includes a flange extending into said first section in spaced relationship with the opposite wall; and a footing extends into said first section generally in alignment with said flange; said flange and said footing serving to assure that said core and coil unit is spaced from said opposite side wall.

3. A power supply as set forth in claim 2 wherein; bracket means are formed integrally with said housing and positioned in the space between said core and coil unit and said opposite side wall to mount at least one additional operative component in spaced relationship to said core and coil unit.

4. A power supply as set forth in claim 2, further including: a plurality of mounting bosses integrally formed in said housing; at least a first of bosses and said footing having support surfaces spaced from said base wall in interfering relationship with said core and coil unit.

5. A power supply including:
a. a preformed case of electrically non-conductive material, including a base wall and spaced apart side walls providing a chamber receiving active components of the power supply;
b. a plurality of bosses integrally formed in said case and extending into said chamber, at least some of said bosses forming mounting surfaces engaging active components of the power supply;
at least some of said bosses having recesses formed therein and exposed to the exterior of said case; and
d. threaded lugs firmly received in said recesses for attachment of said case to a supporting member.

6. A power supply as set forth in claim 5 wherein; said case includes at least one integrally formed partition for assuring physical separation of at least two active components of said power supply; said partition including an offset portion providing an elongated recess in alignment with one of said bosses; and a grounding conductor mounted in said one of said bosses and received in said recess.

7. A power supply as set forth in a claim 6 wherein; said at least one partition includes a main portion and at least one flange portion angled with respect to said main protion and spaced from a corresponding side wall to assure that the active component received adjacent said partition is spaced from said corresponding side wall.

8. A power supply as set forth in claim 6 wherein; said offset portion of said partition is a pre-determined distance form one of said side walls; and said partition also includes a flange portion extending in the same direction as said offset portion at substantially the same predetermined distance from the sidewall opposite said one of said side walls.

9. A power supply as set forth in claim 5, wherein; bracket means are formed integrally with at least one of said side walls for mounting at least one active component.

10. A power supply as set forth in claim 5, further including: a preformed cover overlying the edges of said side walls remote from said base wall.

* * * * *